June 30, 1931.　　　　　L. S. HOWE　　　　　1,812,484

TOOL FOR CUTTING BOX STRAPPING AND THE LIKE

Filed April 5, 1929

Inventor

Leon S. Howe

By W. Clay Lindsey

His Attorney

Patented June 30, 1931

1,812,484

UNITED STATES PATENT OFFICE

LEON S. HOWE, OF NEW BRITAIN, CONNECTICUT, ASSIGNOR TO THE STANLEY WORKS, OF NEW BRITAIN, CONNECTICUT, A CORPORATION OF CONNECTICUT

TOOL FOR CUTTING BOX STRAPPING AND THE LIKE

Application filed April 5, 1929. Serial No. 352,689.

The present invention relates to improvements in tools for cutting box strapping and the like, and more particularly refers to certain improvements over the U. S. Patent No. 1,677,684, granted July 17, 1928.

The practice of applying metal straps or bands about bales, boxes, cases, and other forms of packages has grown to very large proportions, and one of the most serious problems presented by this practice is that of eliminating or reducing the very serious and real danger of injury to the workmen during the application of the strapping, and to those who handle the bound cases, etc. The extent of injury resulting from persons scratching and cutting themselves on box strapping during its application, or after it has been applied, is very large, and each year the amount of compensation paid on account of such injuries runs into hundreds of thousands of dollars. Various efforts have been made with a view to reducing the danger of injury of this kind, and one very distinct advance in the art is provided for by the improved tool covered by said Parsons Patent No. 1,677,684, and wherein is disclosed a tool for cutting the strappings in such manner as to give them rounded ends which are free of projections, burrs and corners.

While said Parsons tool is very advantageous in that the trimmed ends of the strappings are so cut as to make them safe for handling, very serious problems are presented by the clippings which result from the cutting operations. These clippings, owing to the fact that they have four needle-like points projecting in different directions, and the clippings are bent into angular form during the cutting operation, are very capable of inflicting injury of a serious nature. Scratches and punctures from such clippings are easily susceptible to blood poisoning, as has been abundantly proved in actual practice. The clippings cannot be easily brushed from the case being strapped nor from the floor to which they may fall nor from the clothing in which they may become lodged.

The object of the present invention is to provide an improved arrangement whereby box strapping cutting tools of the type shown in said Parsons patent are rendered safe for use, the menace of injury presented by the dangerous clippings, and the annoyance and inconvenience in properly disposing of said clippings being eliminated or, at least, reduced to a large degree. To these ends, the tool is provided with a receptacle so positioned and arranged, relative to the dies and punch, as to catch all of the clippings and retain them until such time as the proper disposition can be made of the same, thus eliminating the necessity of the operator handling or collecting the clippings, and preventing likelihood of injury.

Another object of the invention resides in providing a container or receptacle for the clippings which, while disposed in the relation stated above, is nevertheless so constructed and arranged with reference to the other parts of the tool, that it will in no way interfere with the positioning of the tool between the box and the strapping, and will fulfill its own function without reducing the efficiency of the tool or the facility with which it is used.

A further object of the invention lies in providing an improved tool of this character, in which the receptacle is so constructed and mounted, as to permit of its ready opening for the purpose of discharging the contents.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of an improved tool constructed according to the present invention.

Figure 1:
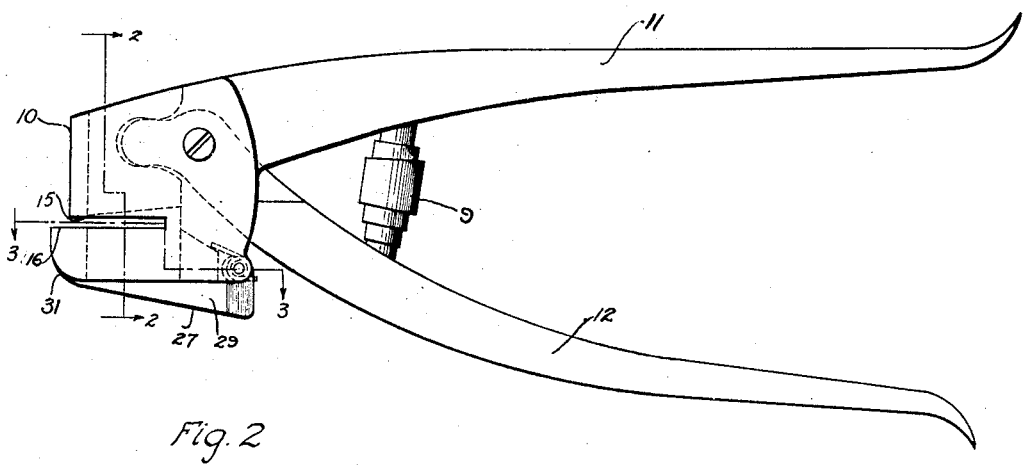

Referring more particularly to the drawings, 10 designates the head of the tool, and 11 a handle by which the head is carried. Pivoted to the head 10 is a cooperating handle 12 by means of which the punch 13 is moved up and down in the head. The punch cooperates with a pair of dies 14.

The handles are normally urged apart so as to raise the punch by means of a spring 9. The head is provided with a through vertical opening 10′, which is generally oblong in cross section. Extending inwardly from the forward wall of the head is a horizontal slot 15 adapted to receive the strap to be cut. The lower wall or edge of this slot extends forwardly so as to form a shelf or lip 16 whereby entry of the strap into the slot is facilitated. The punch 13 may be guided in the head 10 in any appropriate manner and the lower end of the punch is preferably formed, as shown in Figure 5, of said Patent No. 1,677,684, whereby to cooperate with the two disc dies 14.

Below the slot 15 and extending into the opening 10′ are two bosses 25 having at their upper ends generally circular seats in which are mounted the respective dies 14. The dies are connected to the bosses by any appropriate means, such for instance by the screws 26. The above parts are all shown and described in the Patent No. 1,677,684, and have been given the same reference numerals.

Figure 4:
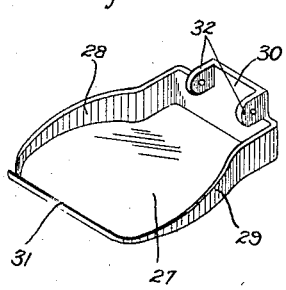
Fig. 4 is a perspective view of the improved receptacle employed.

In accordance with the present invention a receptacle is provided for the tool, such receptacle being shown in Figure 4 and comprising a bottom 27, side walls 28 and 29, a rear wall 30 and a front wall or upturned lip 31. The rear wall 30 carries perforated forwardly extending ears 32 for receiving the pin or pintle 33 on which the receptacle is hingedly or pivotally supported.

Figure 3:
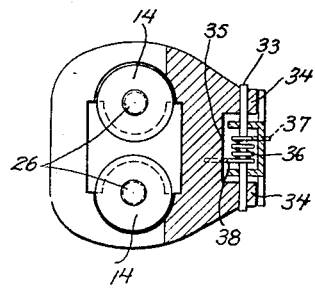
Fig. 3 is a horizontal section taken on the line 3—3 also in Figure 1.

As shown in Figure 3, the ends of the pintle are mounted in perforated bosses or ears 34 on the lower rearward portion of the head 10, the head, between the bosses, being cut away as shown at 35 in order to receive the ears 32, which pivot about the pin 33 in the opening and closing movement of the receptacle. A coil spring 36 has its intermediate portion wound through a number of convolutions about the pivot pin 33 between the ears 32, one terminal portion 37 of the spring being disposed through or against the rear wall 30 of the receptacle while the opposite terminal end 38 is engaged against a portion of the head 10.

It will be observed from Figure 1 that the bottom wall 27 of the receptacle is disposed on an angle with reference to the bottom of the head 10 in such a way that the receptacle is deeper at its rear portion and grows progressively shallower toward its free forward end, the lip 31, which constitutes the front wall of the receptacle being struck on a curvature to gradually merge with the curved lower forward portion of the head 10.

Also preferably the receptacle, as will be observed in Figure 4, is narrower at its rear portion in order to conform to the horizontal cross section configuration of the head 10.

Figure 2:
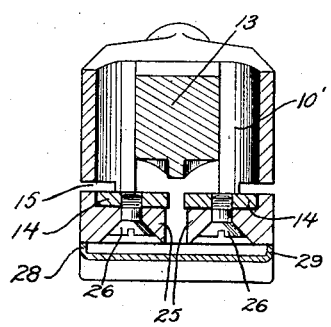
Fig. 2 is a vertical section taken on the line 2—2 in Figure 1.

In the use of the device, the receptacle normally occupies the position shown in Figure 1, being urged thereto by the coil spring 36. In this position, the side walls 28 and 29, as shown in Figure 2, abut against the bottom of the head 10 and maintain the bottom 27 of the receptacle spaced below the head, so that a receptacle cavity is formed for holding a large quantity of the clippings which are the result of the die cutting operation on a box strapping. The receptacle is closed all around. As the clippings are cut and ejected, they will descend between the dies 14 into the receptacle. Due to movement, and jarring of the tool in action, the clippings will be distributed throughout the receptacle, and as before stated, the receptacle will preferably have a capacity for holding a considerable quantity of the clippings, whereby the discharge of the receptacle will not only be required at infrequent intervals.

When the receptacle has become filled with the clippings, the tool is carried to a waste receptacle or to some other destination for the clippings, the receptacle is pushed downwardly at its forward end by the fingers, and the receptacle is rotated about its fulcrum pin 33 so that the clippings will slide out of the receptacle. After the dumping operation, the receptacle is simply released, and the coil spring 36 which has been previously put under tension by the opening movement of the receptacle, will snap the receptacle closed to the position shown in Figure 1, whereupon the tool will be ready to resume operations.

It will be observed from the foregoing description, taken in connection with the accompanying drawings, that a tool provided with the improvements of the present invention may be very effectively and safely used. The receptacle will catch and retain the objectionable and dangerous clippings, so that they are prevented from being indiscriminately scattered over the case and the floor, or from becoming lodged on the clothing; the necessity of any one directly handling the clipping, and the likelihood of any one scratching themselves are avoided.

It is obvious that various changes and modifications may be made in the details of construction and design of the above specifically described embodiment of this invention without departing from the spirit thereof, such changes and modifications being restricted only by the scope of the following claims.

I claim as my invention:

1. An improved tool for cutting box strapping and the like comprising means for cutting the box strapping, and a receptacle hinged to the lower portion of the tool below said cutting means and biased to the closed position, said receptacle having an inclined bottom portion.

2. An improved tool for cutting box strapping and the like comprising means for cutting the box strapping, and a receptacle hinged to the lower portion of the tool below said cutting means and biased to a closed position, said receptacle being deeper at its rear hinged portion and being progressively shallower toward the forward end of the tool and the free end of the receptacle.

3. An improved tool for cutting box strapping and the like comprising a head, a punch and die couple carried by said head, said head having a clearance opening for the clippings, and also having a cut-away portion, a receptacle having ears disposed in said cut-away portion, a hinge pin mounted in the head and extending across said cut-away portion and through said ears, and spring means associated with said hinge pin and with the head and receptacle for biasing the receptacle to a closed position against the lower portion of said head but in communication with said clearance opening.

4. A tool for cutting box strapping and the like comprising a head having a vertical opening therein, cutting elements carried by the head at each side of the opening, a punch operatively associated with the head and having a part cooperating with said cutting elements, and a receptacle hinged to the head and positioned beneath the opening therein to receive clippings which may be cut during operation of the cutting members and the punch.

LEON S. HOWE.